Patented May 5, 1936

2,039,415

UNITED STATES PATENT OFFICE 2,039,415

PRACTICALLY TASTELESS QUININE COMPOUND AND PROCESS FOR THE MANUFACTURE OF SAME

Max Hoffer, Basel, Switzerland, assignor to Hoffmann-La Roche Inc., Nutley, N. J., a corporation of New Jersey No Drawing. Application July 25, 1935, Serial No. 33,124. In Germany August 18, 1934

6 Claims. (Cl. 260—26)

It has been found that with quinine and 2,3-dihydroxy-naphthalene-o-mono-acetic acid a difficultly soluble salt may be obtained, in which the bitter taste of the alkaloid has almost disappeared.

For the manufacture of the new compound a water-soluble quinine salt is allowed to react with a water-soluble salt of 2,3-di-hydroxy-naphthalene-o-mono-acetic acid in aqueous solution, or the quinine base is brought into reaction with an equivalent quantity of the acid in a suitable solvent.

The 2,3-di-hydroxy-naphthalene-o-mono-acetate of quinine crystallizes in needles melting at 195° C. It is practically tasteless. In water it is difficultly, in alcohol rather difficultly soluble. It is to be used in medicine.

*Example*

160 parts by weight of 2,3-di-hydroxy-naphthalene are dissolved with 95 parts by weight of chloro-acetic acid in 700 parts by weight of water on the water-bath. While shaking a solution of 112 parts by weight of potassium hydroxide, dissolved in 300 parts by weight of water, are added within an hour. After two hours more the reaction product is left to cool, the precipitated crystal paste removed by suction and washed with a little alcohol or ether. From the extract unchanged 2,3-di-hydroxy-naphthalene may be regained. The potassium salt of 2,3-di-hydroxy-naphthalene-o-mono-acetic acid is warmed with dilute hydrochloric acid. After cooling the free acid is precipitated in long prismatic needles, which melt with frothing at 157° C. The acid is very easily soluble in alcohol, difficultly soluble in cold, fairly easily soluble in warm water.

To 162 parts by weight of quinine base, dissolved in 600 parts by weight of alcohol 110 parts by weight of 2,3-di-hydroxy-naphthalene-o-mono-acetic acid, dissolved in as little alcohol as possible, are added while stirring and keeping warm. The mixture soon congeals to a paste of crystals of the quinine salt. After cooling the product is removed by suction and washed with cold alcohol. The salt is rather difficultly soluble in alcohol, it crystallizes in needles melting at 195° C., it is tasteless and has practically no aftertaste.

I claim:

1. The 2,3-di-hydroxy-napthhalene-o-mono-acetate of quinine, which crystallizes in needles melting at 195° C., the new compound being difficultly soluble in water, rather difficultly soluble in alcohol and having practically no taste.

2. The process for the manufacture of 2,3-di-hydroxy-naphthalene-o-mono-acetate of quinine, which comprises allowing one of the group consisting of quinine and its salts to react with one of the group consisting of 2,3-di-hydroxy-naphthalene-o-mono-acetic acid and its salts.

3. The process for the manufacture of 2,3-di-hydroxy-naphthalene-o-mono-acetate of quinine, which consists in allowing quinine to react with 2,3-di-hydroxy-naphthalene-o-mono-acetic acid in a solvent.

4. The process for the manufacture of 2,3-di-hydroxy-naphthalene-o-mono-acetate of quinine, which consists in allowing the quinine base to react with 2,3-di-hydroxy-naphthalene-o-mono-acetic acid in alcoholic solution.

5. The process for the manufacture of 2,3-di-hydroxy-naphthalene-o-mono-acetate of quinine, which consists in allowing a quinine salt to react with a water-soluble salt of 2,3-di-hydroxy-naphthalene-o-mono-acetic acid in aqueous solution.

6. The process for the manufacture of 2,3-di-hydroxy-naphthalene-o-mono-acetate of quinine, which consists in allowing the quinine base to react with 2,3-di-hydroxy-naphthalene-o-mono-acetic acid in ethyl alcohol solution.

MAX HOFFER.